F. LACKNER.
NUT MACHINE.
APPLICATION FILED AUG. 23, 1905. RENEWED JUNE 30, 1908.

911,599.

Patented Feb. 9, 1909.
9 SHEETS—SHEET 1.

FIG.I.

WITNESSES:
Herbert Bradley.
Dwight Benton.

Frederick Lackner  INVENTOR
by Christy and Christy
Atty's

F. LACKNER.
NUT MACHINE.
APPLICATION FILED AUG. 23, 1905. RENEWED JUNE 30, 1908.

911,599.

Patented Feb. 9, 1909.
9 SHEETS—SHEET 3.

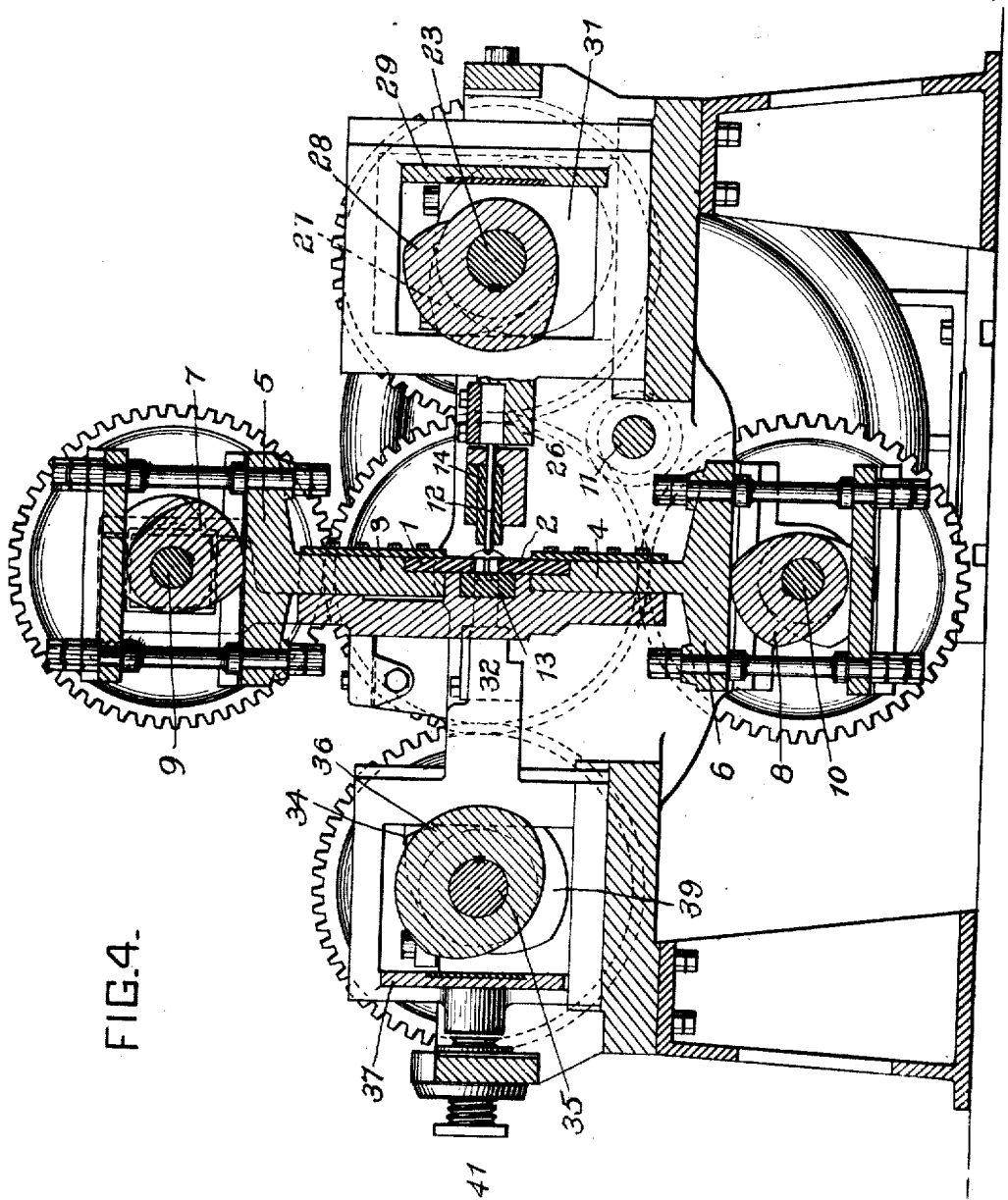

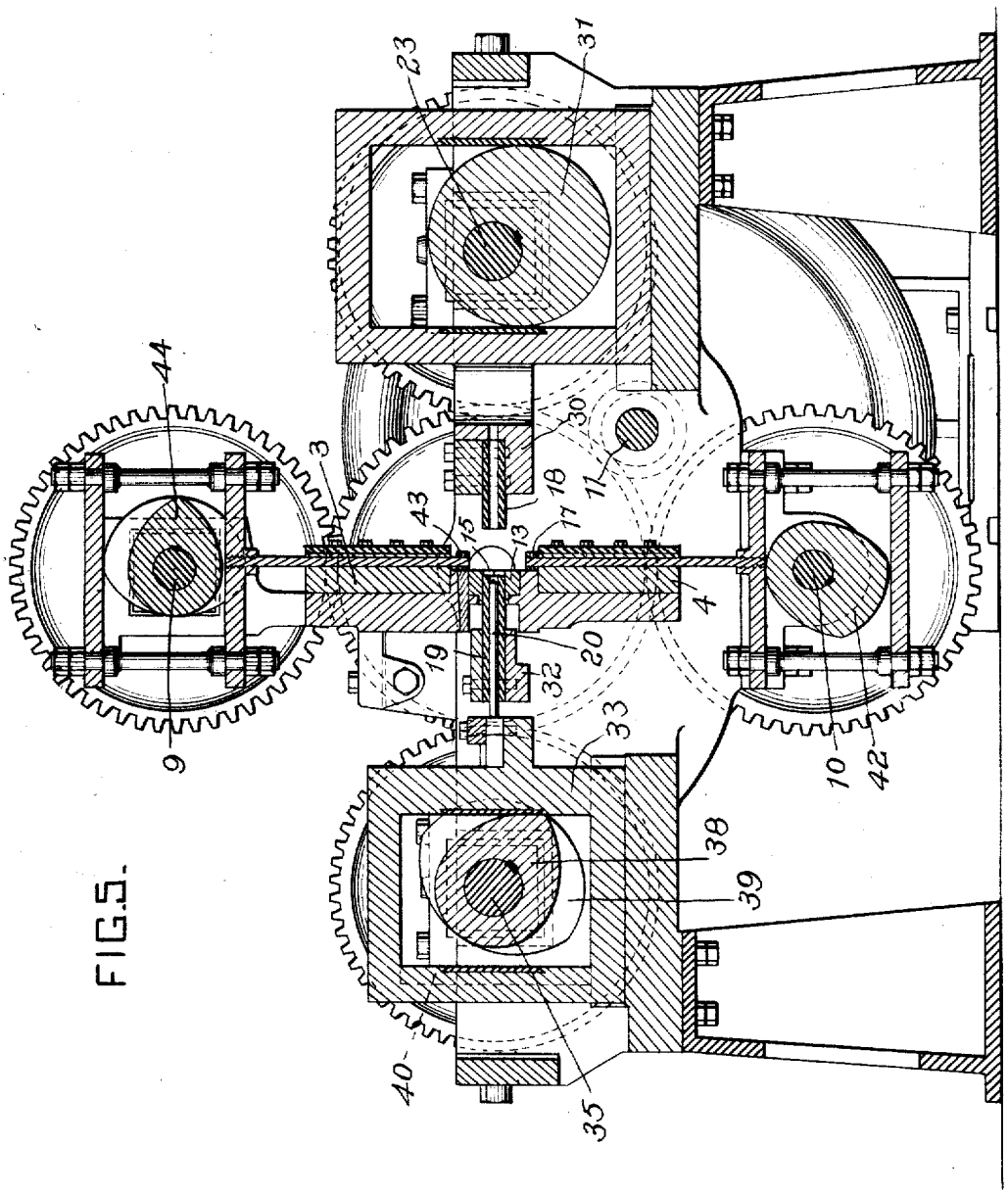

F. LACKNER.
NUT MACHINE.
APPLICATION FILED AUG. 23, 1905. RENEWED JUNE 30, 1908.
911,599.
Patented Feb. 9, 1909.
9 SHEETS—SHEET 6.
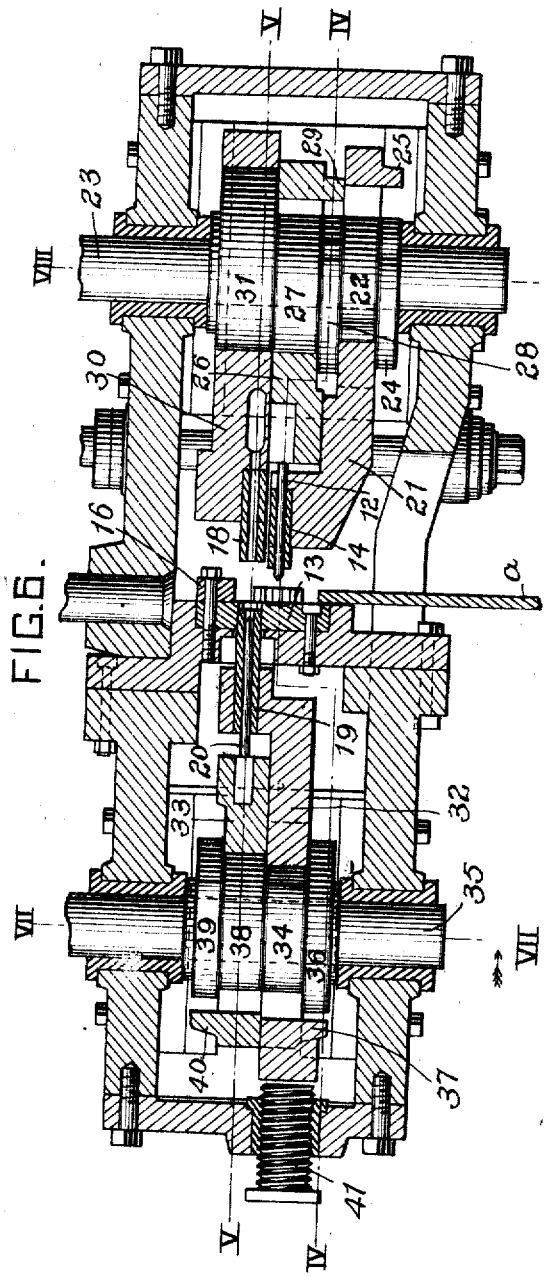
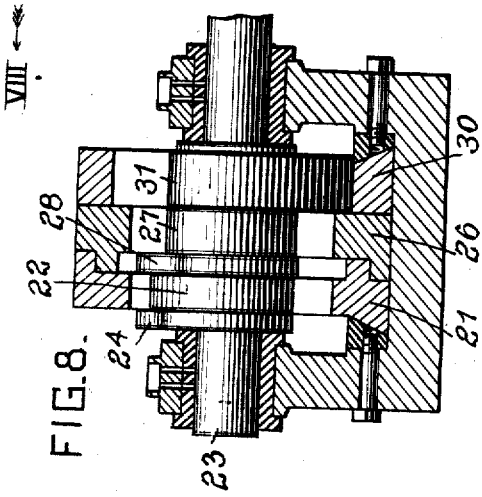
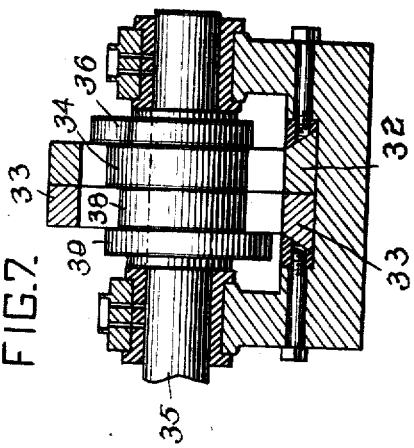
WITNESSES:
Herbert Bradley
Dwight Benton
Frederick Lackner  INVENTOR
by Christy and Christy
Atty's.

F. LACKNER.
NUT MACHINE.
APPLICATION FILED AUG. 23, 1905. RENEWED JUNE 30, 1908.
911,599.
Patented Feb. 9, 1909.
9 SHEETS—SHEET 7.
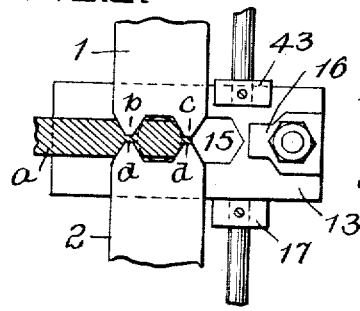
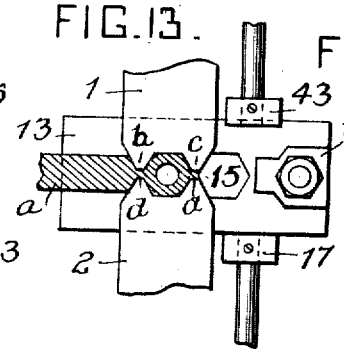
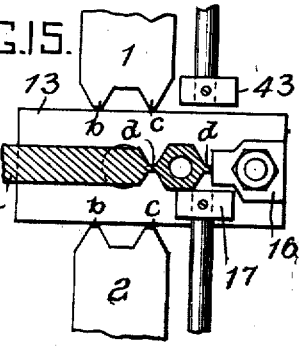
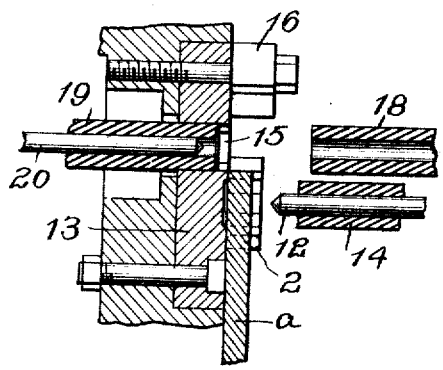
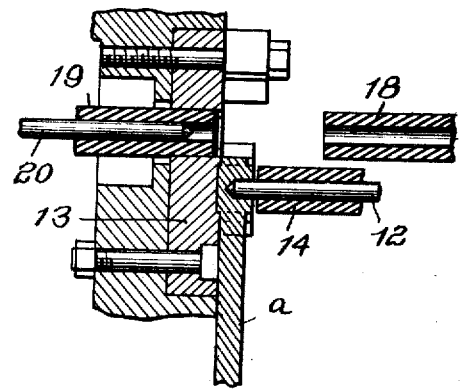
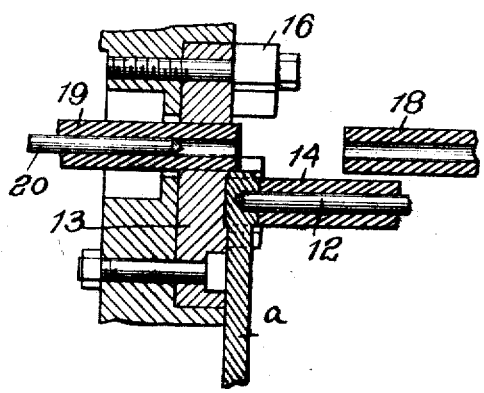
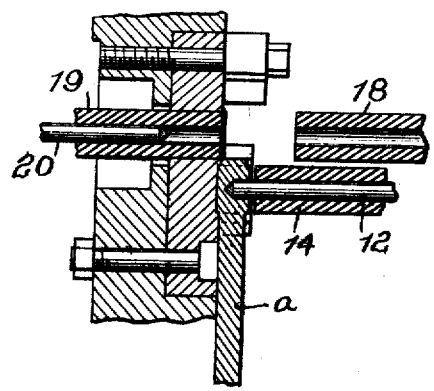
WITNESSES:
INVENTOR
Frederick Lackner
by Christy and Christy
Atty's

F. LACKNER.
NUT MACHINE.
APPLICATION FILED AUG. 23, 1905. RENEWED JUNE 30, 1908.

911,599.

Patented Feb. 9, 1909.
9 SHEETS—SHEET 8.

WITNESSES:
Herbert Bradley
Dwight Benton

INVENTOR
Frederick Lackner
by Christy and Christy
Att'y's.

F. LACKNER.
NUT MACHINE.
APPLICATION FILED AUG. 23, 1905. RENEWED JUNE 30, 1908.

911,599.

Patented Feb. 9, 1909.
9 SHEETS—SHEET 9.

WITNESSES:
Herbert Bradley
Dwight Benton

Frederick Lackner INVENTOR
by Christy and Christy
Att'ys

UNITED STATES PATENT OFFICE.

FREDERICK LACKNER, OF PITTSBURG, PENNSYLVANIA, ASSIGNOR TO NEELY NUT & BOLT COMPANY, OF PITTSBURG, PENNSYLVANIA.

NUT-MACHINE.

No. 911,599.   Specification of Letters Patent.   Patented Feb. 9, 1909.

Application filed August 23, 1905, Serial No. 275,487. Renewed June 30, 1908. Serial No. 441,242.

*To all whom it may concern:*

Be it known that I, FREDERICK LACKNER, residing at Pittsburg, in the county of Allegheny and State of Pennsylvania, a citizen of the United States, have invented or discovered certain new and useful Improvements in Nut-Machines, of which improvements the following is a specification.

The invention described herein relates to certain improvements in the manufacture of nuts, washers, etc.

It has for its object a construction and combination of parts whereby a blank of smaller dimensions than the desired nut or washer is severed transversely from a bar or rod brought to the dimensions desired in the finished nut by punching, the metal displaced by the punch filling out the blank and then bringing the blank to the desired size, shape and configuration.

The invention is hereinafter more fully described and claimed.

Figure 1:
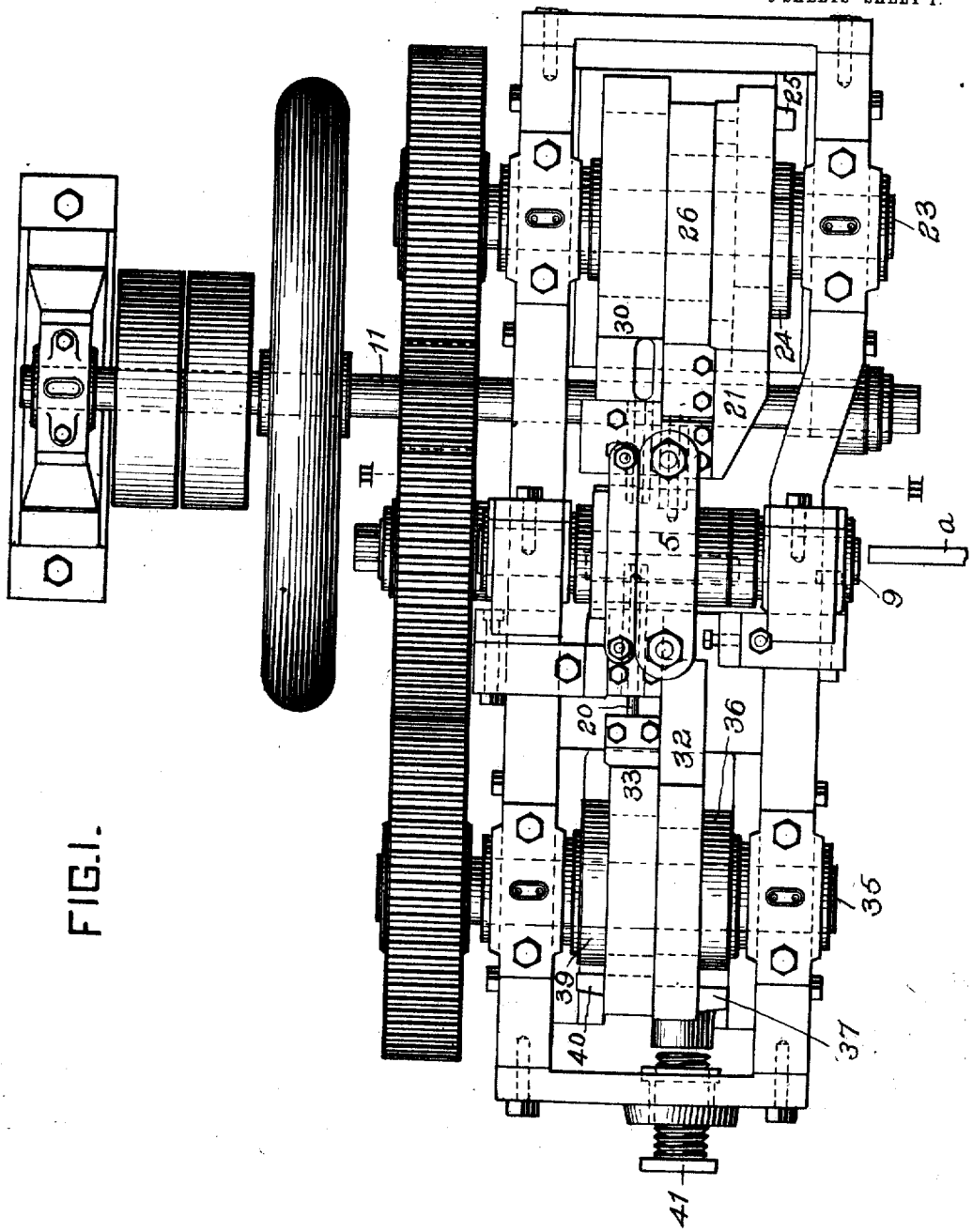
Figure 2:
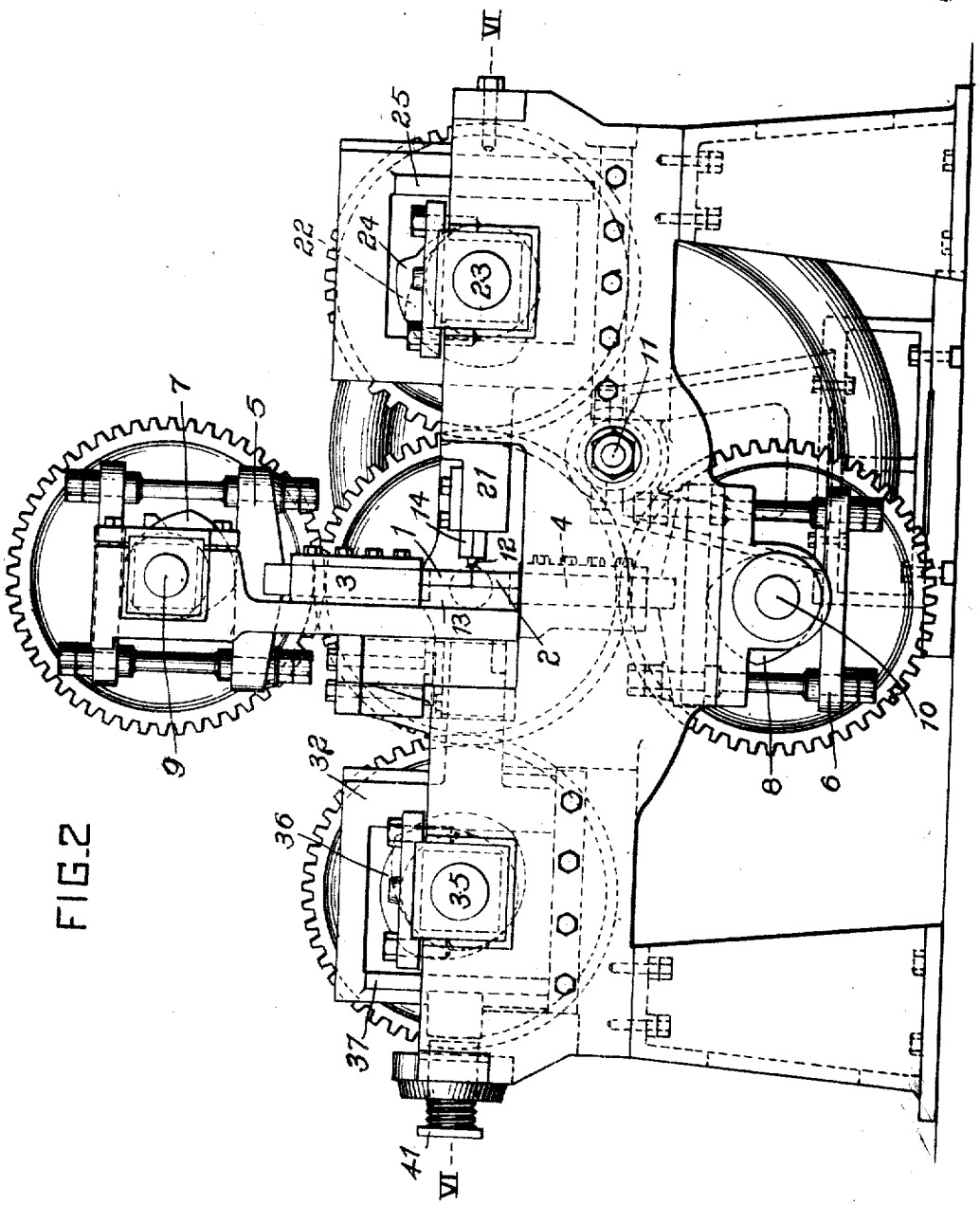
Figure 3:
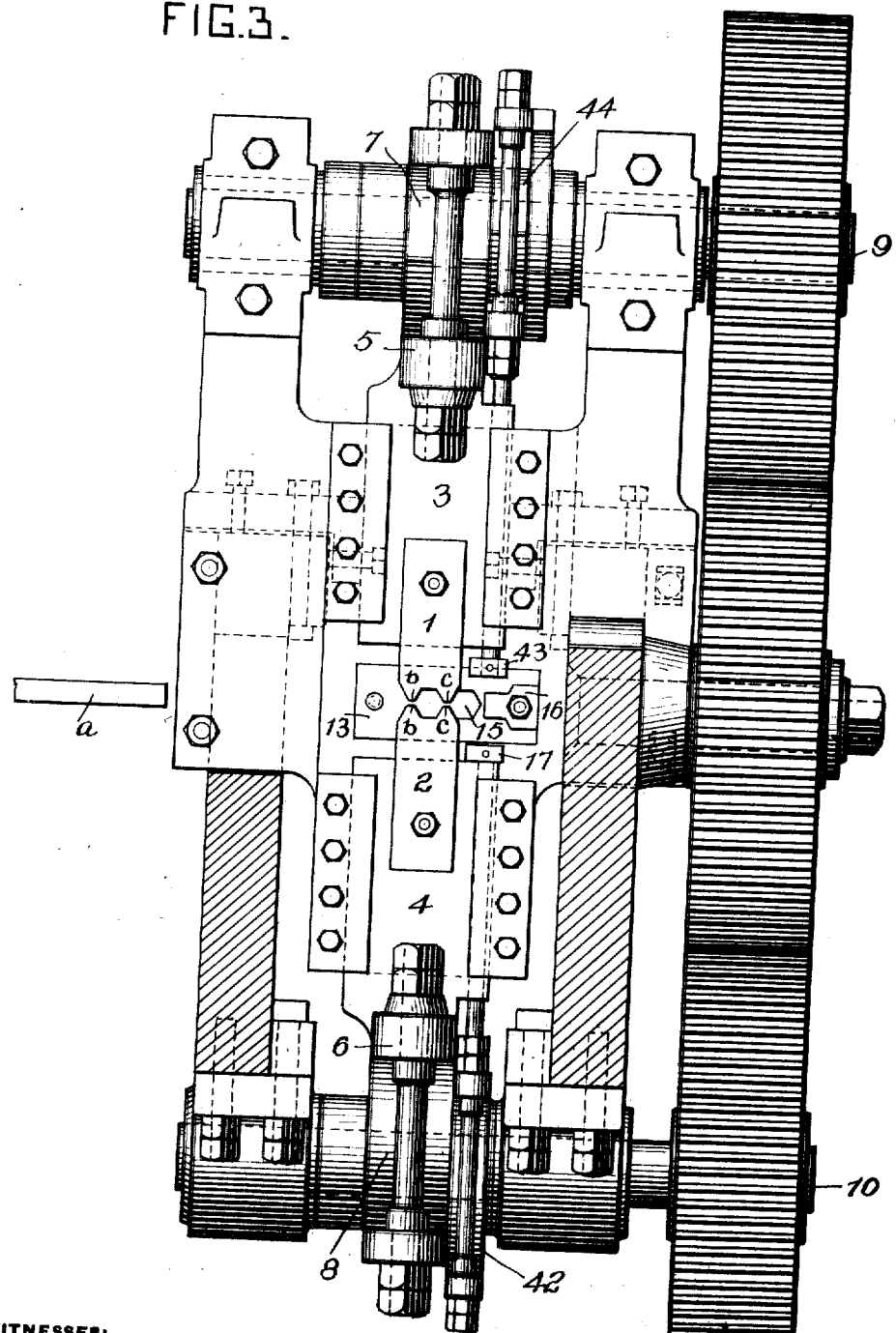
Figure 16:
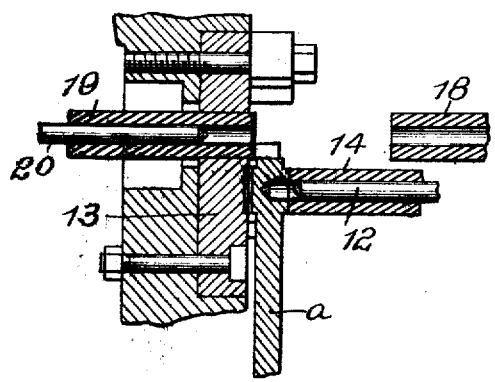
Figure 17:
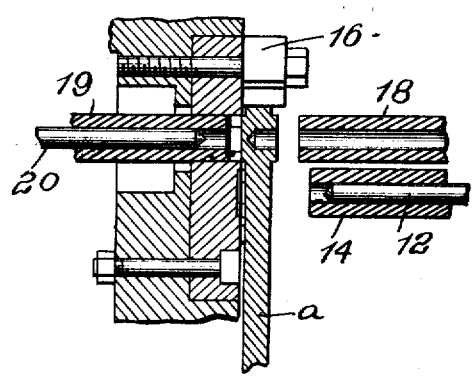

In the accompanying drawings forming a part of this specification, Figure 1 is a top plan view of my improved machine; Fig. 2 is a side elevation of the same; Fig. 3 is a sectional view, the plane of section being indicated by the line III—III Fig. 1; Figs. 4 and 5 are sectional views on plane indicated by the lines IV—IV and V—V Fig. 6; Fig. 6 is a sectional elevation on a plane indicated by the line VI—VI Fig. 2; Figs. 7 and 8 are sectional detail views on planes indicated respectively by the lines VII—VII and VIII—VIII Fig. 6; Figs. 9 to 20 inclusive are detail views illustrating the operation of parts of the machine; Figs. 21 to 27 inclusive are similar views illustrating certain modifications in the operation of the machine.

In the practice of my invention a flat bar having a thickness and width less than the corresponding dimensions desired in the finished nut, is fed transversely of the machine at a point shown in Figs. 1, 3 and 6. When the bar has reached the proper position jaws 1 and 2, secured to slides 3 and 4 moving in vertical guideways, are moved in so as to effect a preliminary shaping of a portion of the bar or rod and a partial separation of such preliminary shaped section from the bar or rod as shown in Figs. 3 and 9. These slides 3 and 4 are connected to yokes 5 and 6 surrounding cams 7 and 8 on shafts 9 and 10, which are rotated through suitable gearing by the power shaft 11.

Figure 18:
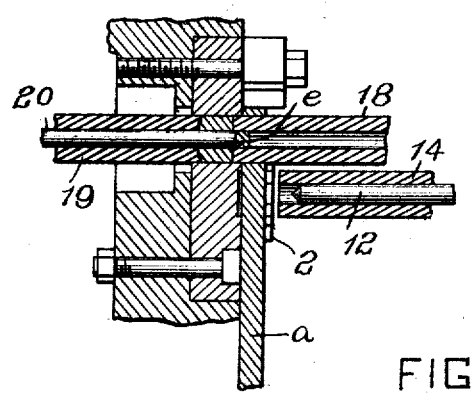
Figure 19:
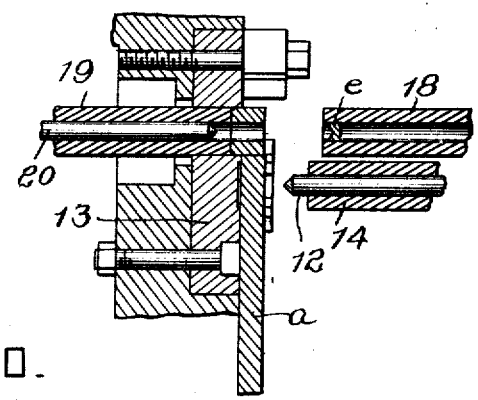
Figure 20:
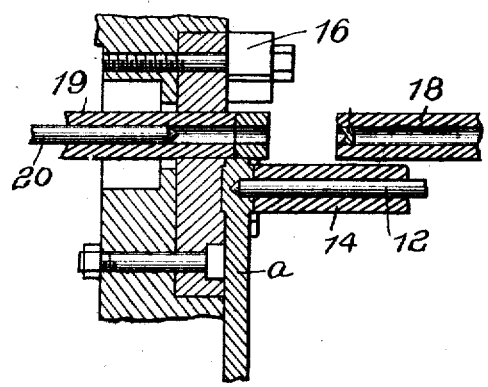

As shown in Figs. 3, 9, 13 and 15, the jaws, 1 and 2, have their ends so shaped as to produce a hexagonal nut but it will be understood by those skilled in the art that other forms of nuts and washers may be produced by suitably forming the shaping faces of the jaws and other shaping surfaces as hereinafter described. The jaws 1 and 2 are provided with cutting or indenting edges $b$ and $c$ which enter the bar and partially sever the blank therefrom as shown in Figs. 9 and 13. As will be seen by reference to Fig. 9, the bar and the blank cut therefrom have a width less than the transverse dimension desired in the finished nut and as will be seen by reference to Figs. 10, 11, 12 and 14 the bar is of a thickness less than the thickness of the desired nut. In order to bring the blank partially severed, as stated, from the bar approximately to the dimensions desired in the finished nut, a punch 12 is caused to move forward while the blank is held in the jaws and pass nearly through the blank. The metal displaced by the punch is forced laterally so as to fill the blank out to conform with the matrix formed by the jaws 1 and 2 and the back wall or die block 13 secured to the machine. When it is desired to form a collar on the nut this die block is slightly recessed as shown in Figs. 10 to 14 so that some of the metal displaced by the punch will enter the said recess. In addition to increasing the transverse dimensions of the blank, the metal displaced by the punch will also effect an increased thickness of the blank as shown in Figs. 11, 12 and 14. As the punch 12 completes its inward movement, a compressing plunger 14 is caused to move forward thereby compressing the blank in the direction of its thickness and bringing the same to the desired size and finish except for the fins $d$ left on the blank by the operation of the jaws 1 and 2. After compressing the blank the plunger 14 is withdrawn and immediately thereafter the punch 12 begins its backward movement. Simultaneous with the rearward movement of the plunger 14, the jaws 1 and 2 are opened leaving the blank unsupported except for its webbed connection $d$ with the bar $a$. As the punch moves backward it will draw the portion of the blank out of the recess in the die-block 13 so that the blank and bar can be shifted to bring the blank into line with the final shaping box 15, formed in the die-block 13. As will be seen by reference to Figs. 13 and 15, the feed movement of the blank and bar is regulated by stop 16 and in order to prevent a sagging down of the blank which is only supported by the thin web d, a supporting block 17 is moved up to support the blank in a vertical direction. A compressing plunger 18 is now moved forward to force the blank into the box 15, thereby shearing off the webs or fins d. As the compressing plunger moves inward a similar compressing plunger 19 moves back to allow the entrance of the blank and a punch 20 is moved forward so that the blank can be forced over the same thereby removing a small web e left by the operation of the punch 12. The metal thus removed is forced into the compressing plunger 18, as shown in Fig. 18. The movement of the compressing plunger 19 is arrested so that a slight compression of the finished nut may be effected by the inward movement of the plunger 18. The plunger 18 now begins its backward movement and the plunger 19 moves forward, its movement being somewhat slower than that of the plunger 18 thereby forcing the finished nut out of the final or finishing matrix 15.

As shown in Figs. 2 and 6, the compressing plunger 14 is secured to a slide 21 connected to a yoke surrounding the cam 22 on the shaft 23. This cam operates only to effect the inward movement of the slide and plunger 14, the outward movement being effected by a cam 24, also on the shaft 23, and operating against a lateral extension 25 of the yoke connected to the slide. The punch 12 is connected to a slide 26 provided with a yoke surrounding a cam 27 on the shaft 23, the rearward movement of the slide and punch being effected by means of a cam 28 operating against a lateral extension 29 on the yoke of the slide. The reciprocation of the slide 30 carrying the compressing plunger 18 is effected by means of a cam 31 also on the shaft 23.

The preferred manner of mounting the slides and yokes is clearly shown in Figs. 6, 7 and 8. The punch 20 and plunger 19 are secured respectively on slides 32 and 33 provided with yokes and mounted in suitable guideways on the bed of the machine, as can be clearly seen by reference to Fig. 7. The inward movement of the slide 32 is effected by a cam 34 on a shaft 35 and its outward movement by a cam 36 operating against a lateral extension 37 on the slide. The inward and outward movements of the slide 33 are effected by means of cams 38 and 39, the former operating in a yoke on the slide 33; the latter on the lateral extension 40 from the yoke. In order to prevent any straining of the shaft 35 during the compressing operation effected by the punches 18 and 19, the cam 34 of the yoke is so constructed and proportioned as to permit the slide 32 when in its rearward movement to bear against an adjustable abutment 41 preferably formed by a screw passing through a portion of the frame of the machine. The movement of the supporting block 17 to support the blank when shifted in front of the box 15 is effected by means of a cam 42 on the shaft 10, the cam operating merely to lift the block which will return to inoperative position by gravity. In order to insure the removal of the finished nut from the end of the plunger 19 when forced out of the box, a knocker 43 is operated by means of a cam 44 on the shaft 9.

Figure 21:
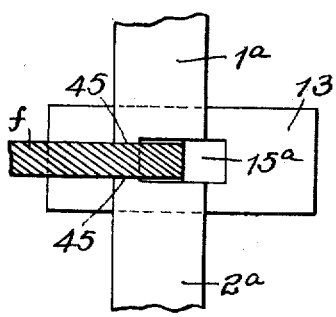
Figure 26:
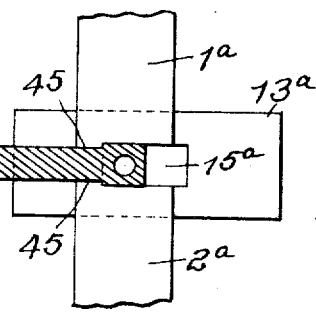
Figure 27:
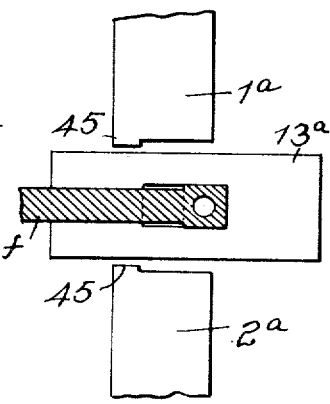
Figure 22:
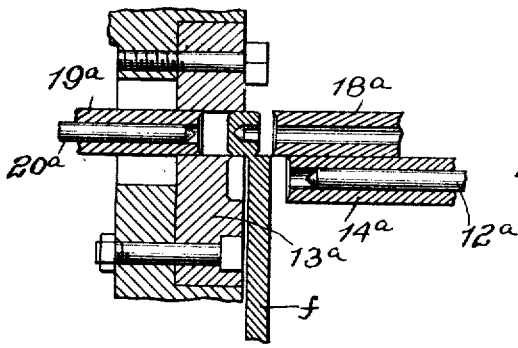
Figure 23:
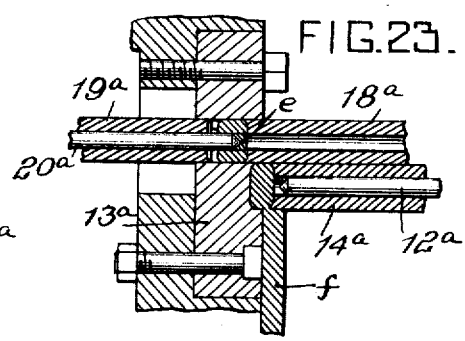
Figure 24:
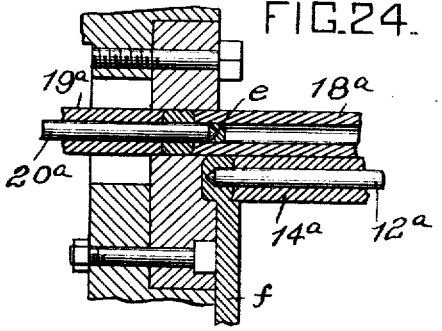
Figure 25:
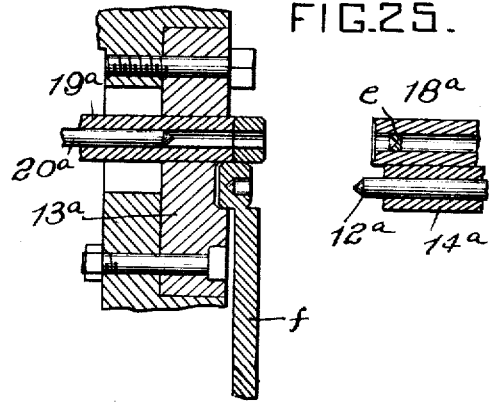

In Figs. 21 to 27 inclusive I have shown mechanism for forming square nuts. As therein shown a bar f of a width and thickness less than the corresponding dimensions of the finished nut is fed transversely across a box or matrix in the die-block 13$^a$. When in this position the jaws 1$^a$ and 2$^a$ are moved down so as to form top and bottom extensions of the die-box or matrix. The jaws 1$^a$ and 2$^a$ are provided with gripping extensions 45 which merely serve to hold the bar f in position. As soon as the bar is gripped by these jaws the plunger 14$^a$ is moved forward to force the metal in line with the box into the same and partially sever it from the bar f, as shown in Fig. 23. The punch 12$^a$ is now advanced to displace the metal in the center of the blank and cause the same to spread out vertically towards the upper and lower sides of the box and the jaw extensions thereof, and also to produce an increased thickness of the blank. To allow this increase in thickness by metal displacement by the punch 12$^a$, the plunger 14$^a$ is slightly withdrawn during the inward movement of the punch 12$^a$. It will be observed that one side of the box into which the blank is forced by the plunger 14$^a$ is formed by the plunger 18$^a$. As the plunger and punch 14$^a$ and 12$^a$ are withdrawn so that the bar f and the blank on the end thereof, may be moved forward, the latter into line with a box 15$^a$ in the die block 13$^a$, the jaws 1$^a$ and 2$^a$ having been previously withdrawn. As soon as this feed of the bar and blank has occurred the jaws are again brought to operative position to grip the bar and to complete the preliminary shaping box in the block 13$^a$. As shown in Fig. 21, the plungers 14$^a$ and 18$^a$ are now moved forward together, the plunger 18$^a$ being a little in advance of the plunger 14$^a$. By the operation of these two plungers and the punch 12$^a$ a blank is preliminarily shaped and partially severed from the bar and the previously partially formed blank is forced into the box 15$^a$ and entirely severed from the bar. During the inward movement of the plunger 18$^a$, the plunger 19$^a$ is withdrawn so as to permit the entrance of the blank, and the punch 20$^a$ is advanced so as to force the small web of metal e from the blank into the passage through the plunger 18ª. The plunger 18ª should have such a movement relative to the movement of the plunger 14ª that the end of the plunger 18ª will be within the wall of the box 15ª at the time that the plunger 14ª and the punch 12ª operate to form a blank, for the reason that the punch 18ª forms a portion of the matrix in which the blank is formed by the operation of the plunger 14ª and 12ª.

While I have described herein an improved method for the manufacture of nuts, washers, etc., such method is not claimed herein as the same will form the subject matter of an application to be filed.

I claim herein as my invention:

1. In a machine for forming nuts, etc., the combination of jaws provided with shaping faces, means for shifting such jaws towards each other to grip and shape the end of the bar or rod without severing such partially shaped portion from the bar or rod, a punch, means for forcing the punch partially through the blank to laterally displace a portion of the metal inclosed by the jaws, and while held therein, and a plunger movable over the punch to compress and spread the metal held within the jaws, and means for severing the blank from the bar and completing the perforation of the blank.

2. In a machine for forming nuts, etc., the combination of jaws movable towards and from each other and provided with shaping faces and having cutting or indenting edges, adapted to partially shape the end of a bar or rod without severing the shaped portion from the bar, a punch for partially perforating the blank and thereby laterally displacing a portion of the metal of the blank to enlarge the section of metal inclosed by the jaws and while held therein, a compressing plunger movable over the punch, and means for severing the blank from the bar and completing the perforation of the blank.

3. In a machine for forming nuts, etc., the combination of jaws movable towards and from each other, provided with faces adapted to partially shape, but not sever a portion of a bar or rod from the latter, a punch for laterally displacing a portion of the metal inclosed in the jaws, a compressing plunger surrounding the punch, the punch and plunger being movable independent of each other in a direction at right angles to the direction of feed of the bar to the jaws, and means for severing the blank from the bar and completing the perforation of the blank.

4. In a nut machine, the combination of a sectional matrix adapted to partially sever and preliminarily shape a section from the bar or rod, a punch movable at an angle to the line of feed of the bar or rod, means for shifting the punch to partially perforate and laterally displace a portion of the metal held in the matrix and thereby spreading the partially severed section while held in the matrix, a compressing plunger movable over the punch, and means for severing the blank from the bar and completing the perforation of the blank.

5. In a machine for forming nuts, washers, etc., the combination of a sectional matrix adapted to partially sever, and partially shape a section from a bar or rod, a punch operative at an angle to the direction of feed of the bar or rod, means for shifting the punch to partially perforate and laterally displace a portion of the metal held in the matrix and thereby enlarge the partially severed section, a compressing plunger operative in line with the punch and means for removing the enlarged section from the bar or rod.

6. In a machine for the manufacture of nuts, washers, etc., the combination of means for peripherally shaping and partially punching a blank on the end of the bar or rod without severing such blank from the bar or rod, a matrix, hollow plungers arranged in line with the matrix and movable towards and from each other, a punch movable back and forth with one of the plungers, means for shifting the plungers towards and from each other and means for shifting the punch opposite to the movement of the surrounding plunger.

In testimony whereof, I have hereunto set my hand.

FREDERICK LACKNER.

Witnesses:
 ALICE A. TRILL,
 BAYARD H. CHRISTY.